(12) United States Patent
Jiang et al.

(10) Patent No.: US 7,474,895 B1
(45) Date of Patent: Jan. 6, 2009

(54) FREQUENCY REUSE IN WIRELESS COMMUNICATION NETWORKS

(75) Inventors: James Jiang, Richardson, TX (US); YanWei Wu, Shenzhen (CN); Yonggang Fang, San Diego, CA (US); HeXing Liu, Shenzhen (CN); Jun Han, San Diego, CA (US)

(73) Assignee: ZTE (USA) Inc., Iselin, NJ (US)

( * ) Notice: Subject to any disclaimer, the term of this patent is extended or adjusted under 35 U.S.C. 154(b) by 582 days.

(21) Appl. No.: 11/073,427

(22) Filed: Mar. 4, 2005

Related U.S. Application Data

(60) Provisional application No. 60/550,652, filed on Mar. 4, 2004, provisional application No. 60/556,995, filed on Mar. 25, 2004.

(51) Int. Cl.
*H04Q 7/20* (2006.01)

(52) U.S. Cl. ............... 455/447; 455/452.1; 455/509; 455/436

(58) Field of Classification Search .......... 455/445, 455/447, 450, 452.1, 452.2, 453, 63.1, 63.2, 455/439, 438, 436, 67.11, 509, 511, 515, 455/517, 446, 422.1, 442; 370/321, 350
See application file for complete search history.

(56) References Cited

U.S. PATENT DOCUMENTS

| | | |
|---|---|---|
| 5,711,011 A | 1/1998 | Urs et al. |
| 5,815,799 A | 9/1998 | Barnes et al. |
| 5,867,491 A | 2/1999 | Derango et al. |
| 5,917,823 A | 6/1999 | Benning et al. |
| 6,049,528 A | 4/2000 | Hendel et al. |
| 6,115,370 A | 9/2000 | Struhsaker et al. |
| 6,128,301 A | 10/2000 | Bernstein |
| 6,131,012 A | 10/2000 | Struhsaker et al. |
| 6,138,011 A | 10/2000 | Sanders, III et al. |
| 6,178,327 B1* | 1/2001 | Gomez ............... 455/445 |
| 6,243,581 B1 | 6/2001 | Jawanda |
| 6,263,368 B1 | 7/2001 | Martin |
| 6,292,671 B1 | 9/2001 | Mansour |
| 6,421,335 B1 | 7/2002 | Kilkki et al. |
| 6,538,606 B2 | 3/2003 | Quinn et al. |
| 6,553,234 B1* | 4/2003 | Florea ............... 455/447 |
| 6,738,617 B2 | 5/2004 | Rosen et al. |
| 6,862,453 B2 | 3/2005 | Collins |
| 6,882,856 B1 | 4/2005 | Alterman et al. |
| 6,898,436 B2 | 5/2005 | Crockett et al. |
| 6,917,819 B2 | 7/2005 | Collins |

(Continued)

FOREIGN PATENT DOCUMENTS

WO   WO03/101025   5/2003

(Continued)

OTHER PUBLICATIONS

IEEE 802.16-2004, "IEEE Standard for Local and Metropolitan Area Networks, Part 16: Air Interface for Fixed Broadband Wireless Access Systems", Oct. 1, 2004, 895 pages.

(Continued)

*Primary Examiner*—John J Lee
(74) *Attorney, Agent, or Firm*—Fish & Richardson P.C.

(57) ABSTRACT

Methods and systems for implementing frequency reuse techniques in wireless communication systems such as OFDM systems.

18 Claims, 7 Drawing Sheets

U.S. PATENT DOCUMENTS

| | | |
|---|---|---|
| 6,947,752 B2 | 9/2005 | Collins |
| 7,035,664 B2 | 4/2006 | Kim |
| 7,254,119 B2 | 8/2007 | Jiang et al. |
| 7,343,163 B1 | 3/2008 | Perkins et al. |
| 2002/0085516 A1 | 7/2002 | Bridgelall |
| 2002/0152342 A1 | 10/2002 | Das et al. |
| 2003/0050067 A1* | 3/2003 | Rozmaryn .................. 455/447 |
| 2003/0065805 A1 | 4/2003 | Barnes, Jr. |
| 2003/0133421 A1 | 7/2003 | Sundar et al. |
| 2003/0134650 A1 | 7/2003 | Sundar et al. |
| 2004/0259556 A1* | 12/2004 | Czys ........................... 455/447 |
| 2005/0096062 A1* | 5/2005 | Ji et al. ....................... 455/450 |
| 2008/0101291 A1 | 5/2008 | Jiang et al. |

FOREIGN PATENT DOCUMENTS

| | | |
|---|---|---|
| WO | WO2004/017525 | 2/2004 |

OTHER PUBLICATIONS

IEEE 802.16e-2005, "IEEE Standard for Fixed and Mobile Broadband Wireless Access Systems, Part 16: Air Interface for Fixed and Mobile Broadband Wireless Access Systems and Amendment 2: Physical and Medium Access Control Layers for Combined Fixed and Mobile Operation in Licensed Bands and Corrigendum 1", Feb. 18, 2006, (864 pages).

* cited by examiner

FREQUENCY REUSE IN WIRELESS COMMUNICATION NETWORKS

This application claims the benefits from U.S. Provisional Patent Application Nos. 60/550,652 entitled "FREQUENCY REUSE IN WIRELESS COMMUNICATION NETWORKS" and filed Mar. 4, 2004 and 60/556,995 entitled "FREQUENCY REUSE IN WIRELESS COMMUNICATION NETWORKS" and filed Mar. 25, 2004. The entire disclosures of the above two prior patent applications are incorporated herein by reference as part of the specification of this application.

BACKGROUND

This application relates to wireless communication systems and techniques that implement reuse of communication frequencies.

Wireless communication systems use electromagnetic waves to communicate with wireless communication devices located within radio cells of coverage areas of the systems. A radio spectral range or band designated or allocated for a wireless communication service or a particular class of wireless services may be divided into different radio carrier frequencies for generating different communication frequency channels. This use of different frequencies for different communication channels may be used in various multiple access radio wireless communication systems, e.g., frequency division multiple access (FDMA) systems and time division multiple access (TDMA) systems.

For a given wireless system, the communication capacity increases as the number of the communication frequency channels increases. For this and other reasons, the radio frequency is a valuable resource in such wireless communication systems. Unfortunately, two different frequency channels, when placed too close to each other in frequency, can interfere or cross talk with each other to create noise and thus reduce the signal-to-noise ratio. Hence, some system implementations impose a minimum frequency spacing between two adjacent channels to mitigate the adverse effect of the interference. Implementations of such a scheme can limit the number of frequency channels within a given radio spectral band. The minimum frequency spacing should be as small as possible in order to allow for as many channels as possible within a given spectral range.

One technique to reduce the minimum frequency spacing between two adjacent channels is to generate different channels within a given band by using the orthogonal frequency division multiplexing (OFDM) to generate channel spectral profiles that are orthogonal to one another without interference when different channels are centered at selected equally-spaced frequencies. Under the OFDM, the frequency spacing can be smaller than the minimum spacing in conventional channels and hence increase the number of channels within a given band. The existing and developing specifications under IEEE 806.16x standards support wireless communications under OFDM and orthogonal frequency division multiple access (OFDMA). The draft for IEEE 806.16d published in January 2004 provides technical specifications for OFDM and OFDMA wireless systems.

In OFDM, OFDMA and other wireless systems using channels at different frequencies, channel frequencies are generally strategically allocated to radio cells throughout the coverage regions. When properly allocated or planned, one or more channel frequencies may be reused in different radio cells that are spatially separated to reduce the interference below a tolerance level for that system. This frequency reuse is an important and integral part of the system design and can significantly affect the system capacity and the performance.

SUMMARY

This application includes wireless communication systems and techniques for reusing frequencies. In one implementation, available frequency channels at different channel frequencies for a base station are allocated into a nonreusable frequency pool for channel frequencies designated for use by the base station only, a reusable frequency pool for channel frequencies that can be used by the base station and neighboring base stations, and an unallocated frequency pool for channel frequencies are not allocated to the nonreusable and reusable frequency pools. A channel frequency from either the reusable frequency pool or the unallocated frequency pool is allocated to a wireless subscriber station in communication with the base station when the subscriber station is in a non-hand-off zone to communicate with the base station only. A channel frequency from the nonreusable frequency pool for the base station is allocated to a wireless subscriber station in communication with the base station when the wireless subscriber station is in a hand-off zone to communicate with the base station and at least one neighboring base station. The above frequency allocation may be dynamically adjusted to increase the efficient reuse of frequencies.

In another implementation, a method for frequency reuse in a wireless communication system is described to allocate available frequency channels at different channel frequencies for a base station and its neighboring base stations into a nonreusable frequency pool for channel frequencies designated for use by the base station only, and a reusable frequency pool for channel frequencies that can be used by the base station and neighboring base stations. A channel frequency from the reusable frequency pool is allocated to a wireless subscriber station in communication with the base station when the subscriber station is in a non-hand-off zone to communicate with the base station only. A channel frequency from the nonreusable frequency pool for the base station is allocated to a wireless subscriber station in communication with the base station when the wireless subscriber station is in a hand-off zone to communicate with the base station and at least one neighboring base station.

These and other implementations, examples, variations, and associated advantages are described in detail in the following drawings, textual description, and claims.

DETAILED DESCRIPTION

Figure 1:
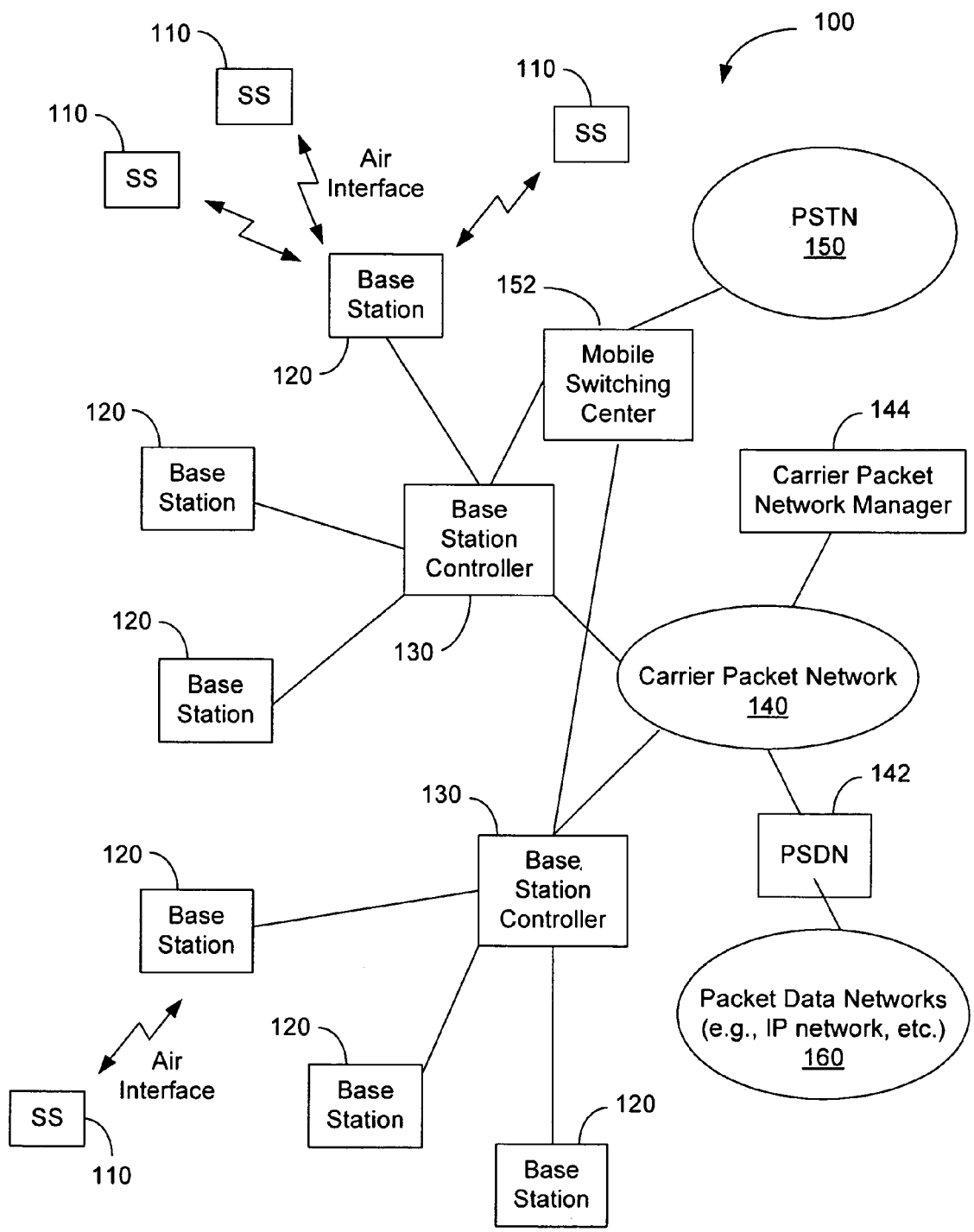
FIG. 1 shows an example of a wireless communication system that may implement a frequency reuse described in this application.

FIG. 1 illustrates an exemplary wireless communication system 100 that uses communication channels at different frequencies to provide wireless communication services based on frequency reuse described in this application. The system 100 may include a network of base stations (BSs) or base station transceivers 120 that are spatially distributed in a service area to form a radio access network for wireless subscribed or subscriber stations (SSs) 110. In some implementations, a base station 120 may be designed to have directional antennas and to produce two or more directional beams to further divide each cell into different sections. Base station controllers (BSCs) 130 are connected, usually with wires or cables, to BSs 120 and control the connected BSs 120. Each BSC 130 is usually connected to and controls two or more designated BSs 120.

The wireless system 100 may include a carrier packet network 140 that may be connected to one or more public switched telephone networks (PSTN) 150 and one or more packet data networks 160 (e.g., an IP network). A mobile switching center (MSC) 152 may be used as an interface between the BSCs 130 and the PSTN 101. A packet data serving node 142 may be used to provide an interface between the carrier-packet network 140 and the packet data network 160. In addition, a carrier packet network manager 144 may be connected to the carrier packet network 140 to provide various network management functions, such as such as an AAA server for authentication, authorization, and accounting (AAA) functions.

Each subscribed station 110 may be a stationary or mobile wireless communication device. Examples of a stationary wireless device may include desktop computers and computer servers. Examples of a mobile wireless device may include mobile wireless phones, Personal Digital Assistants (PDAs), and mobile computers. A subscribed station 110 may be any communication device capable of wirelessly communicating with base stations 120. In the examples described here, mobile wireless devices or mobile stations (MSs) are used as exemplary implementations of the subscribed stations.

The system 100 uses communication channels at different carrier frequencies to provide wireless communication services to the subscribed stations 110. Because only a limited frequency bandwidth may be allocated to the system 100, carrier frequencies are reused in the system 100 to increase the number of subscribed stations 110 that can be serviced at the same time within the system 100. Hence, the reuse of a carrier frequency means that at least two subscribed stations 110 may use the same carrier frequency at the same time in the system 100.

Figure 2:
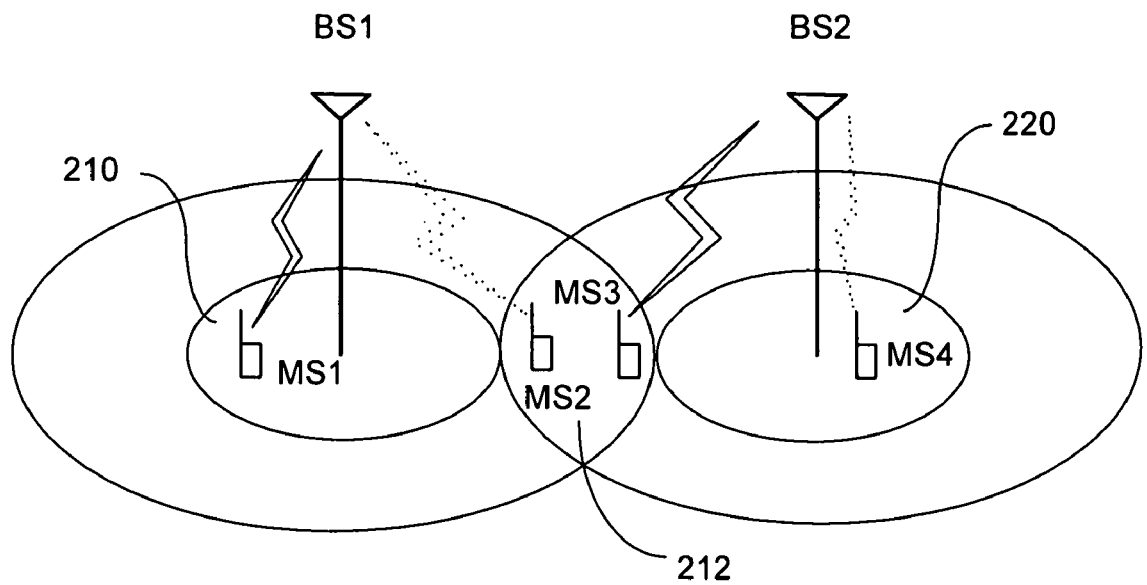
FIG. 2 illustrates division of a hand-off zone and a non-hand-off zone for each base station.

FIG. 2 illustrates one exemplary implementation of the frequency reuse of this application. Two neighboring base stations BS1 and BS2 in the system 100 divide their respective radio cells into two zones, a hand-off zone and a non-hand-off zone based on the radial distance from the respective base station. In the hand-off zone, a subscribed station receives signals from both base stations BS1 and BS2 and may be operated to select either of the two base stations BS1 and BS2 to communicate. Notably, a subscribed station may switch from BS1 to BS2 in the hand-off zone or vice versa. In the non-hand-off zone of the cell, a subscribed station receives signals only from its own base station but not from the other neighboring station. To be more accurately, the signals from the base station in the neighboring cell are below the threshold power level for a normal communication link.

As a specific example, FIG. 2 shows that the cell of the base station BS1 has a central region 210 around the BS1 as the non-hand-off zone in which a signal from the neighboring BS2 is not sufficiently strong to allow for a subscribed station in the region 210 to communicate with the BS2. Similarly, the cell of the neighboring base station BS2 has a central zone 220 as the non-hand-off zone in which a subscribed station only communicates with the BS2. A region 212 between the BS1 and BS2 outside the non-hand-off zones 210 and 220 is shown as the hand-off zone for at least the base stations BS1 and BS2 and may also receive signals from other neighboring base stations. Similar hand-off zones exist for BS1 with other neighboring base stations and are not illustrated here.

Based on the above zoning of neighboring cells, the available channel frequencies for each base station in the system 100 may be divided into frequencies in three different frequency pools: (1) nonreusable frequency pool having frequencies that can be used by only one of neighboring base stations and cannot be used simultaneously by two or more neighboring stations, (2) unallocated frequency pool having frequencies that are not presently allocated to any base stations or any of the neighboring base stations, and (3) reusable frequency pool having frequencies that can be used by any of the neighboring base stations. In the example shown in FIG. 2, a frequency in the nonreusable frequency pool for BS1 can only be used for communication with BS1 and cannot be used for communication with BS2 or other neighboring cells or base stations. A frequency in the reusable frequency pool for BS1 can be used for BS1 and BS2, and other BS1's neighboring base stations may be used by a subscribed station to communicate with either or both of BS1 and BS2. A frequency in the unallocated frequency pool may be assigned to the reusable and nonreusable frequency pools as needed.

In some implementations of the frequency reuse based on the above frequency pools, frequencies may be dynamically assigned and allocated to different pools to efficiently use the available frequencies. Hence, a frequency may be in one pool at one point of time but may be reassigned to another pool at a different point of time. More specifically, the allocation of frequencies in the above three frequency pools for a base station BS1 may be made according to a location of the subscribed station with respect to BS1.

Figure 3:
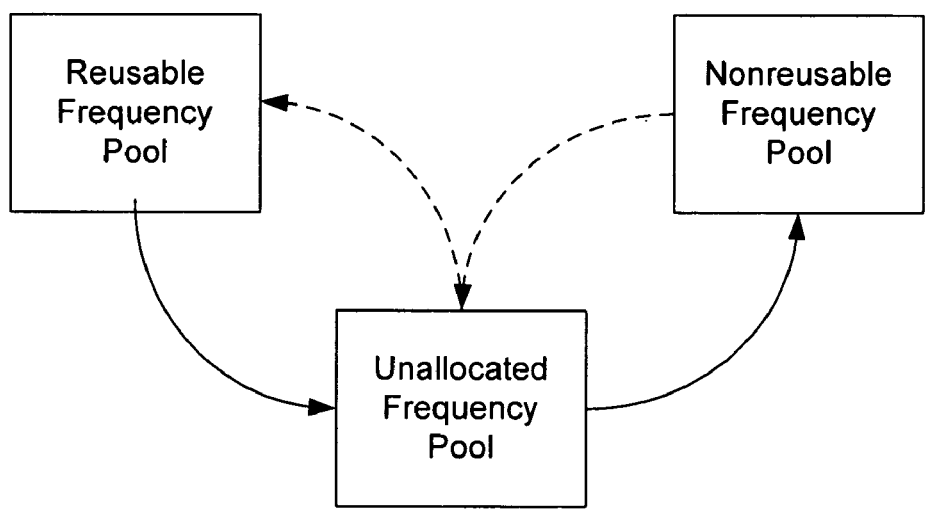
FIG. 3 illustrates one implementation of the dynamic frequency allocation based on a reusable frequency pool, a nonreusable frequency pool, and an unallocated frequency pool for a base station.

FIG. 3 illustrates one example of the frequency allocation for the base station BS1 shown in FIG. 2. Assume a subscribed station, such as a mobile station at MS1 shown in FIG. 2, is located in a non-hand-off zone 210 of the base station BS1 and communicates with BS1. At this time, the mobile station MS1 is assigned with a frequency from the reusable frequency pool for BS1 because the same frequency may be used by the neighboring BS2 in communication with another station in the non-hand-off zone 220 of BS2 without interference. Signals at this frequency or other frequencies from the neighboring stations such as BS2 are weak and below a threshold power level for normal communication. This mobile station MS1 in the zone 210, however, continues to monitor strengths of signals received from neighboring base stations such as BS2. As the mobile station MS1 changes its position with respect to BS1, the strengths of received signals from BS1 and neighboring base stations change accordingly. A corresponding BSC for the BS1 and its neighboring base stations including BS2 receives information on the signal strengths received by each subscribed station to determine whether a subscribed station is in a hand-off zone or a non-hand-off zone.

As an example, when a signal at a channel frequency A received by the mobile station (e.g., MS1) from a neighboring base station (e.g., BS2) exceeds the threshold, the mobile station notifies this condition to its current hosting base station (e.g., BS1) by sensing an appropriate message. The base station BS1 then sends a message to the corresponding BSC regarding this condition. Upon receiving this message, the BSC determines whether the mobile station MS1 is in the hand-off zone 212 with BS2. If the BSC determines that the mobile station MS1 is now in the hand-off zone 212 with BS2, the BSC instructs the mobile station MS1 to switch from the current channel frequency A in the reusable frequency pool to another channel frequency B selected from the unallocated frequency pool to either continue the communication link with BS1 or to switch the link to BS2. If the mobile station MS1 continues to communicate with BS1 in the hand-off zone 212, the frequency B selected from the unallocated frequency pool becomes part of the nonreusable frequency pool for BS1 and becomes unavailable for use by BS2 or any other BS1's neighboring base stations. If the mobile station MS1 switches to communicate with BS2 in the hand-off zone 212, the frequency B selected from the unallocated frequency pool becomes part of the nonreusable frequency pool for BS2 and cannot be used by BS1 and any other BS2's neighboring base stations. Hence, in this transition from the zone 210 of BS1 to the hand-off zone 212 with the BS2, two frequency assignments occur: (1) releasing the channel frequency A from the reusable frequency pool to the unallocated frequency pool and (2) assigning the channel frequency B from the unallocated frequency pool to the nonreusable frequency pool for either BS1 or BS2. Two solid arrowed lines in FIG. 3 represent this process.

Assume the mobile station is initially in the hand-off zone 212 and uses a frequency B in a nonreusable frequency pool for either BS1 or BS2, and the mobile station moves towards BS2. When the mobile station detects that the signal from the BS1 drops below the threshold, the mobile station sends a message to notify BS2 of this condition. The BSC for BS2, after receiving the notice from BS2, determines that the mobile station is now in zone 220 and thus instructs the mobile station through BS2 to switch from the frequency B to a new frequency C selected from the reusable frequency pool for BS2. The original frequency B is released to the unallocated frequency pool. This process is illustrated by the dashed arrowed lines in FIG. 3.

Notably, in the above examples, the allocation of frequencies in different frequency pools is dynamically adjusted as a frequency for one mobile station in communication with a base station changes. The allocation of a frequency may change from one pool to another over time and the associated use of that frequency also changes accordingly. This division of frequency pools and the dynamic allocation allow for efficient reuse of available frequencies in the system.

Figure 4:
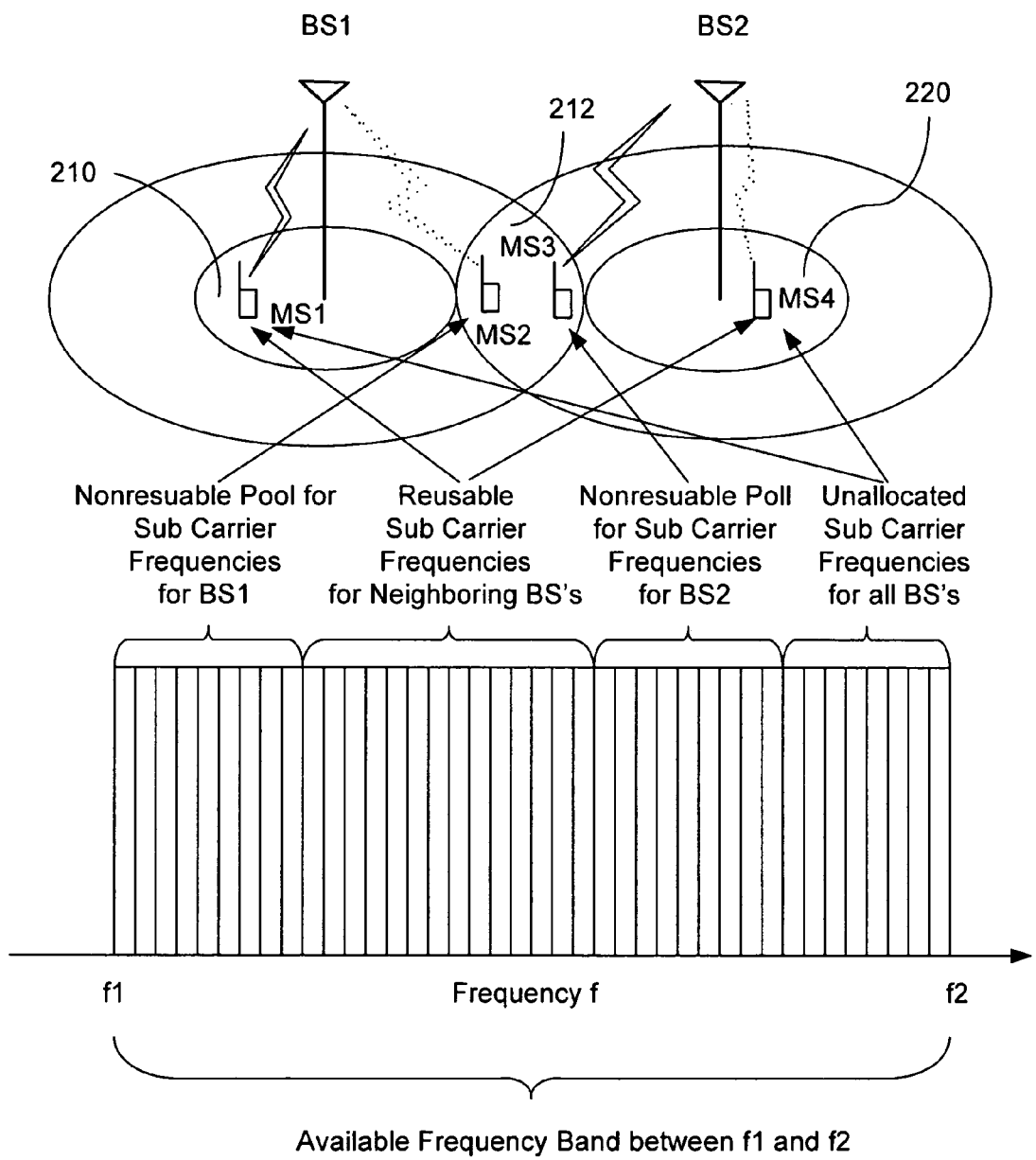
FIGS. 4, 5A, 5B, and 5C show examples of the frequency reuse.

FIG. 4 illustrates another exemplary implementation of the frequency reuse based on the above frequency pools. When a mobile station MS1 is located within the non-hand-off zone 210 in communication with the base station BS1, a frequency from either the reusable frequency pool or the unallocated frequency pool may be used. Similarly, a mobile station MS4 in the non-hand-off zone 220 may use a frequency from either the reusable frequency pool or the unallocated frequency pool to communicate with the base station BS2. When a mobile station is in the hand-off zone 212 for BS1 and BS2, a nonreusable frequency is selected from either the nonreusable frequency pool for BS1 when the mobile station (MS2) communicates with BS1 or the nonreusable frequency pool for BS2 when the mobile station (MS3) communicates with BS2.

Figure 5A:
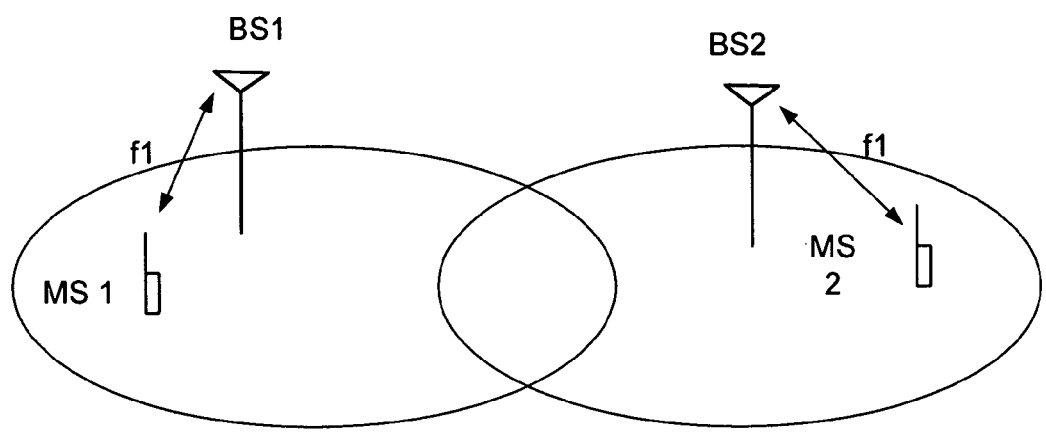
Figure 5B:
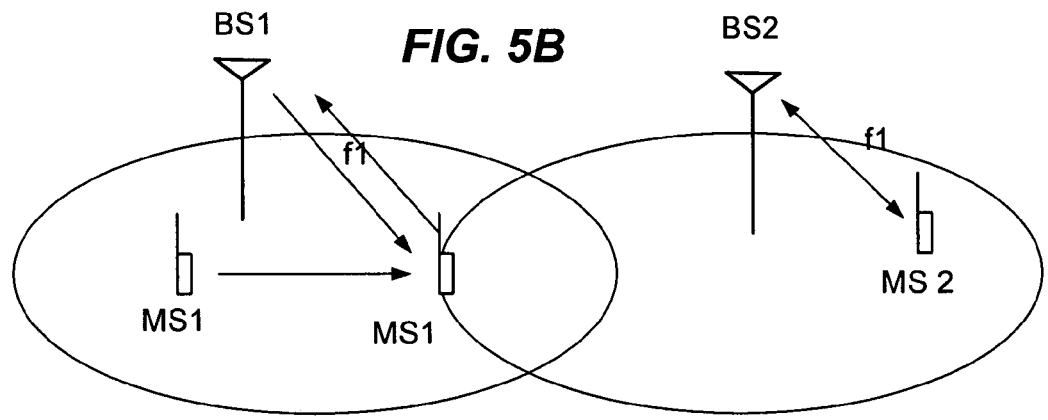
Figure 5C:
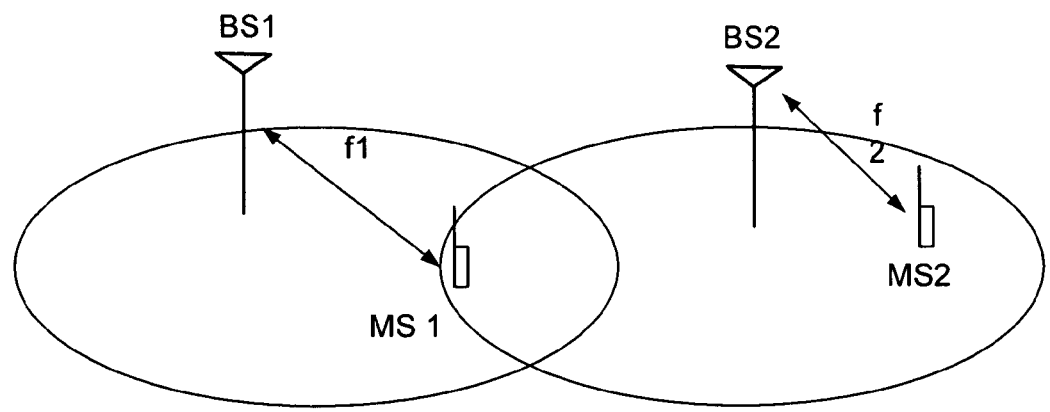

FIGS. 5A, 5B, and 5C further illustrate another example of the frequency reuse. In FIG. 5A, the mobile station MS1 is in the non-hand-off zone of BS1 and communicates with BS1 over a frequency f1. The frequency f1 is either from the reusable frequency pool or the nonallocated frequency pool. Another mobile station MS2 in the non-hand-off zone of a neighboring BS2 can use the same frequency f1 to communicate with the BS2. At these locations, MS1 does not receive a signal from BS2 that is sufficient in power for normal communication operation and MS2 does not receive a signal from BS1 that is sufficient in power for normal communication operation. In FIG. 5B, MS1 moves into the hand-off zone between the base stations BS1 and BS2 and receives signals from both BS1 and BS2. MS1 notifies BS1 of the received signal from BS2 by sending a message to BS1. Under this circumstance, the same frequency f1 can no longer be used by both BS1 and BS2. At least one of BS1 and BS2 must change from the frequency f1 to a different frequency. FIG. 5C illustrates the situation where BS2 switches to a different frequency f2 while BS1 remains on the frequency f1. The frequency f1 is no longer part of the reusable frequency pool or the nonallocated frequency pool and is now reallocated to a nonreusable frequency pool for BS1.

In the above examples for the frequency reuse, each base station may be used to allocate and adjust frequencies available to that particular BS so that the dynamic allocation of frequencies for that BS is a local operation at that base station. This frequency reuse at the base station level increases the operating speed of the frequency reuse. The base station can report the frequency allocation to its BSC. The BSC may adjust the frequencies available to that and other base stations under its control.

Each base station may be designed to include directional antennas or an antenna array to radiate different directional beams to cover different sectors within a cell. Using a base station as the origin, such sectors divide a cell along the polar angular direction while the hand-off zone and non-hand-off zone divide cell along the radial direction from the base station. The above use of the three frequency pools and dynamic allocation of frequencies may be applied to different sectors.

Figure 6:
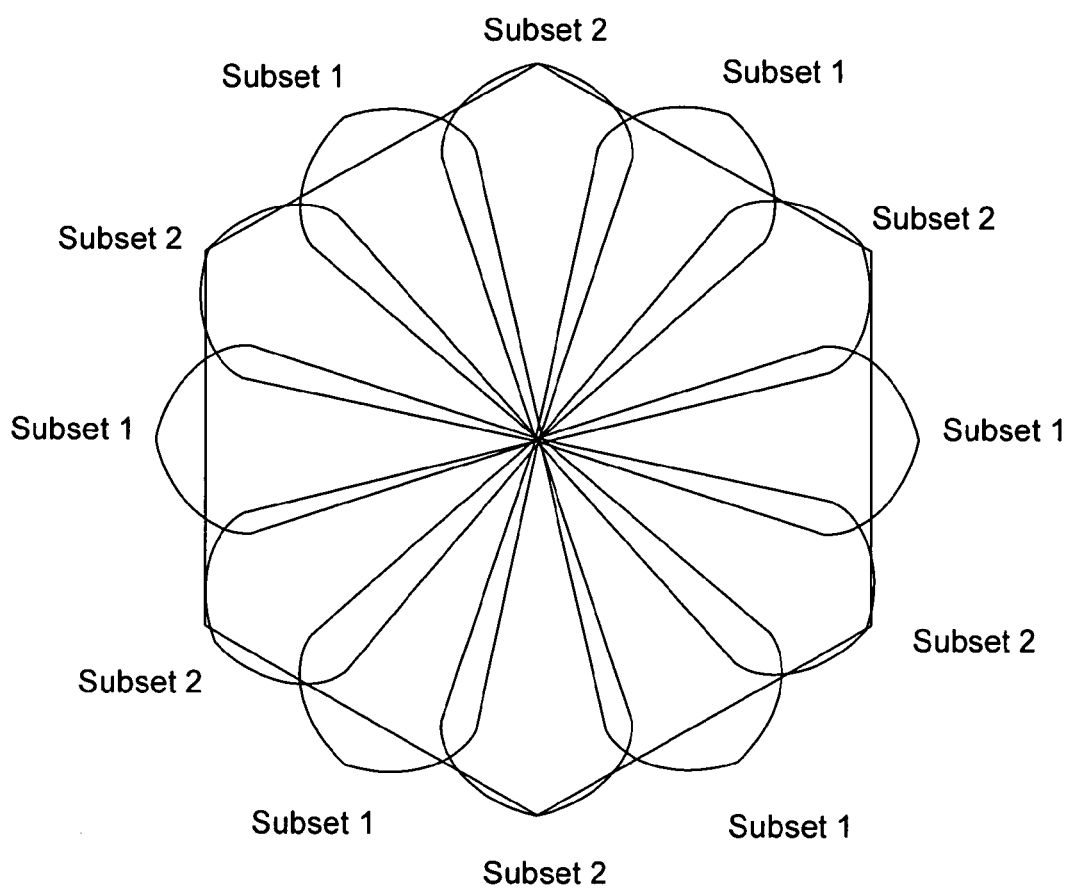
FIG. 6 shows an example of a base station with antennas to produce different beams to divide a cell into different sectors to further increase the efficiency of the frequency reuse.

FIG. 6 illustrates one example of such a base station with "smart" directional antennas or an array of antennas to produce different radiation beams to cover different sectors of a radio cell. The base station may be located at an edge of the cell or a center of the cell to produce desired directional radio beams. For example, the cell may be divided into three 120-degree sectors or six 60-degree sectors along the polar angular direction. In some implementations, two adjacent sectors may have a partial spatial overlap and hence may be assigned with different frequencies to reduce interference. The non-adjacent sectors do not have a spatial overlap and thus may use the same frequencies. Therefore, in a sectorized cell, the available frequencies to the cell may be divide into at least two different frequency groups where frequencies in one group are different frequencies in a different group. Two adjacent cell sectors may be assigned to use two different frequency groups. Two non adjacent cell sectors may be assigned to use the same frequency group or two different frequency groups. In the example in FIG. 6, two different frequency groups or subsets are made. In each cell sector, the hand-off zone and non-hand-off zones are applied so that the frequencies available to that sector are assigned into the reusable, nonreusable, and unallocated frequency pools to implement the frequency reuse described above.

The frequency reuse techniques described above may be applied to the communication bands from 2 to 11 GHz under OFDM and OFDMA provided in IEEE 802.16d (January, 2004). In OFDM and OFDMA systems, the available frequency band is divided into subcarriers at different frequencies that are orthogonal. In an OFDMA system, a subchannel is formed from a subset of subcarriers and is used as the basic unit for the "frequency" described above in the frequency reuse. Hence, available subchannels to a base station are allocated to the three different frequency pools and the subchannels are dynamically allocated. In one implementation of the OFDMA, for example, a total of 32 sub channels are allocated to each radio cell.

Figure 7A:
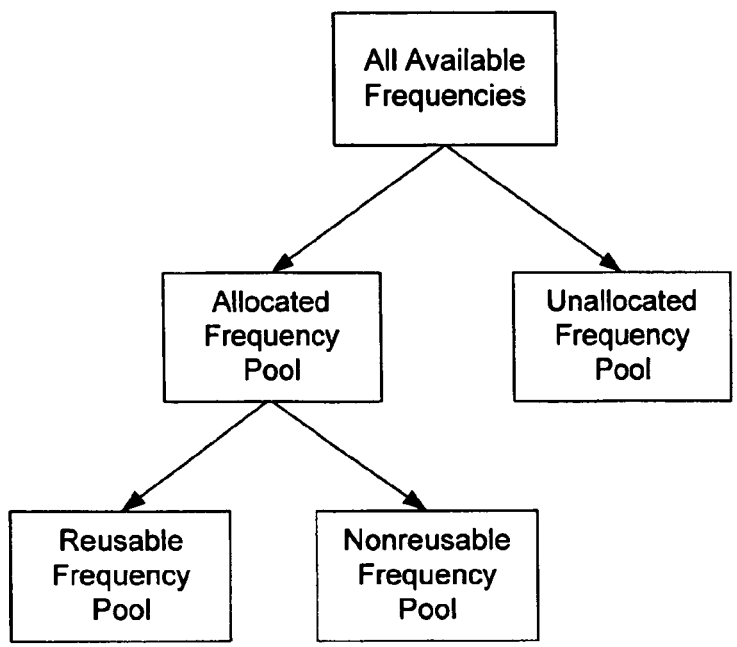
FIGS. 7A, 7B, and 8 show examples of alternative frequency reuse.
Figure 7B:
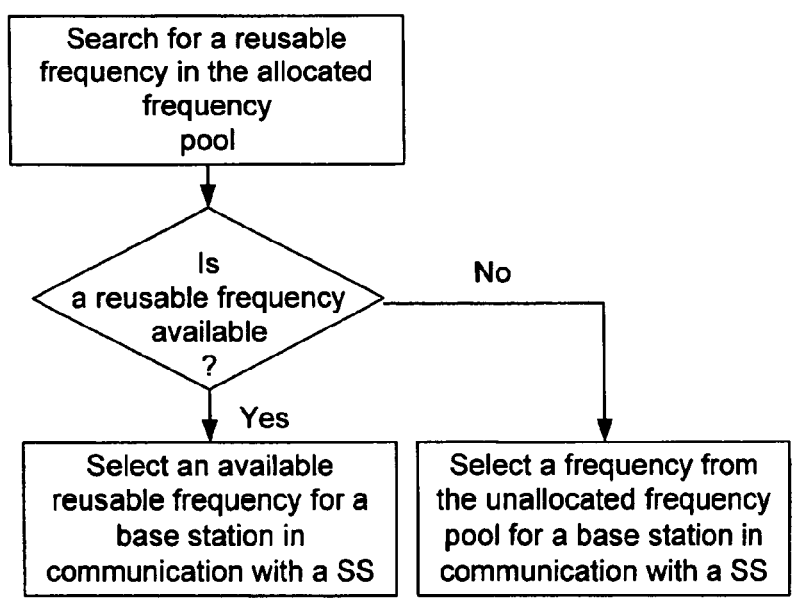

The above frequency reuse techniques may be implemented in different manners. As an example, FIG. 7A shows a frequency reuse implementation where available frequencies are divided in "allocated" and "unallocated" pools first. The allocated frequency pool is then further divided into a nonreusable frequency pool and a reusable frequency pool. In the reusable frequency pool, frequencies are allocated to base stations but can be reused for adjacent base stations for subscribed stations that are not in a hand-off zone 212 shown in FIG. 2. To efficiently reuse all available frequencies, one implementation may search for an available frequency in the allocated frequency pool first and take a frequency from the unallocated frequency pool only when the reusable frequency pool is empty. This specific reuse is shown in an example in FIG. 7B.

Figure 8:
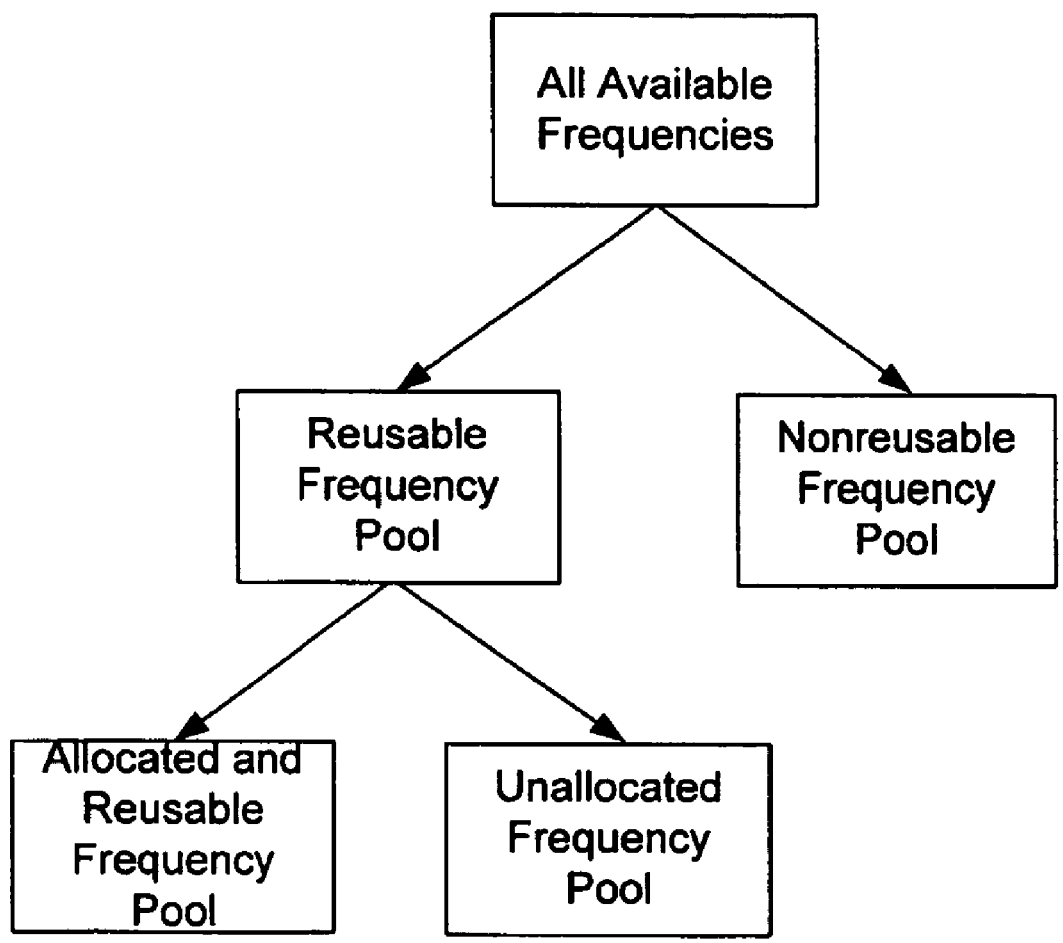

FIG. 8 shows another alternative frequency reuse where all frequencies are first divided into "reusable" and "unreusable" frequency pools. For reusable frequencies in the reusable frequency pool, the frequencies are further divided into a unallocated frequency pool where each frequency is not allocated to any base station and can be used in any base station for any subscribed station at any location within the network, and an allocated but reusable frequency pool in which a frequency allocated to one base station can be used to an adjacent base station for communication with a subscribed station that is not in the hand-off zone between the two base stations.

In implementations, the above described techniques and their variations may be implemented as computer software instructions. A base station and its base station controller may be used execute the operations. Such software instructions may be stored in an article with one or more machine-readable storage media or stored in one or more machine-readable storage devices connected to one or more computers in the wireless system. In operation, the instructions are executed by, e.g., one or more computer processors, to cause the described functions and operations for frequency reuse to be executed.

Only a few implementations are disclosed. However, it is understood that variations and enhancements may be made.

What is claimed is:

1. A method for frequency reuse in a wireless communication system, comprising:
   allocating available frequency channels at different channel frequencies for a base station into a nonreusable frequency pool for channel frequencies designated for use by the base station only, a reusable frequency pool for channel frequencies that can be used by the base station and neighboring base stations, and an unallocated frequency pool for channel frequencies that are not allocated to the nonreusable and the reusable frequency pool;
   allocating a channel frequency from either the reusable frequency pool or the unallocated frequency pool to a wireless subscriber station in communication with the base station when the wireless subscriber station is in a non-hand-off zone to communicate with the base station only; and
   allocating a channel frequency from the nonreusable frequency pool for the base station to a wireless subscriber station in communication with the base station when the wireless subscriber station is in a hand-off zone to communicate with the base station and at least one neighboring base station.

2. The method as in claim 1, further comprising allocating a new channel frequency designated for use with the neighboring base station to the wireless subscriber station in the hand-off zone when the subscriber station is switched to communicate with the neighboring base station.

3. The method as in claim 1, wherein each base station has an antenna array to radiate radio beams into different sectors wherein each sector has a hand-off zone and a non-hand off zone, the method further comprising allocating different frequency channels to two adjacent sectors.

4. The method as in claim 3, further comprising allocating same frequency channels to two sectors that are not adjacent to each other.

5. The method as in claim 1, further comprising dynamically allocating channel frequencies among the nonreusable frequency pool, the reusable frequency pool and the unallocated frequency pool.

6. The method as in claim 1, wherein the frequency channels are subcarrier frequencies in orthogonal frequency division multiplexing (OFDM).

7. The method as in claim 1, wherein the frequency channels are subchannels in orthogonal frequency division multiple access (OFDMA).

8. A method for frequency reuse in a wireless communication system, comprising:
   allocating available frequency channels at different channel frequencies for a base station and its neighboring base stations into a nonreusable frequency pool for channel frequencies designated for use by the base station only, and a reusable frequency pool for channel frequencies that can be used by the base station and its neighboring base stations;
   allocating a channel frequency from the reusable frequency pool to a wireless subscriber station in communication with the base station when the wireless subscriber station is in a non-hand-off zone to communicate with the base station only; and
   allocating a channel frequency from the nonreusable frequency pool for the base station to a wireless subscriber station in communication with the base station when the wireless subscriber station is in a hand-off zone to communicate with the base station and at least one neighboring base station.

9. The method as in claim 8, wherein the channel frequency from the reusable frequency pool that is not allocated to another base station.

10. The method as in claim 8, wherein the channel frequency from the reusable frequency pool that is already allocated to another base station.

11. The method as in claim 8, further comprising allocating another channel frequency, that is from the reusable frequency pool and that is not allocated to another base station, to a wireless subscriber station in communication with a base station when the wireless subscriber station is in a hand-off zone to communicate with the base station and at least one neighboring base station.

12. The method as in claim 8, wherein each base station in the system has an antenna array to radiate radio beams into different sectors wherein each sector has a hand-off zone and a non-hand off zone, the method further comprising allocating different frequency channels to two adjacent sectors.

13. A method for frequency reuse in a wireless communication system, comprising:
   allocating available frequency channels at different channel frequencies in the wireless communication system into an allocated frequency pool for channel frequencies allocated to base stations, and a unallocated frequency pool for channel frequencies that can be used by any base station in communication with any subscribed station at any location relative to the any base station;
   allocating a reusable channel frequency allocated to a base station from the allocated frequency pool to a wireless subscriber station in communication with a second base station adjacent to the base station when the wireless subscriber station is in a non-hand-off zone to communicate with the second base station; and
   allocating a nonreusable channel frequency from the allocated frequency pool for the base station assigned with the nonreusable channel frequency to a wireless subscriber station in communication with the base station when the wireless subscriber station is in a hand-off zone to communicate with the base station and at least one neighboring base station.

14. The method as in claim 13, wherein each base station in the system has an antenna array to radiate radio beams into different sectors wherein each sector has a hand-off zone and a non-hand off zone, the method further comprising allocating different frequency channels to two adjacent sectors.

15. A wireless communication system, comprising:
a plurality of base stations spatially distributed to wirelessly communicate with subscriber stations via radio links that comprise orthogonal frequency division multiplexing (OFDM) subcarriers;
a plurality of base station controllers, each coupled to control and communicate with at least two base stations within the plurality of base stations; and
a mechanism to control the plurality of base stations and the plurality of base station controllers to:
allocate available frequency channels at different channel frequencies for a base station and its neighboring base stations into a nonreusable frequency pool for channel frequencies designated for use by the base station only, and a reusable frequency pool for channel frequencies that can be used by the base station and its neighboring base stations;
allocate a channel frequency from the reusable frequency pool to a wireless subscriber station in communication with the base station when the wireless subscriber station is in a non-hand-off zone to communicate with the base station only; and
allocate a channel frequency from the nonreusable frequency pool for the base station to a wireless subscriber station in communication with the base station when the wireless subscriber station is in a hand-off zone to communicate with the base station and at least one neighboring base station.

16. A wireless communication system, comprising:
a plurality of base stations spatially distributed to wirelessly communicate with subscriber stations via radio links that comprise orthogonal frequency division multiplexing (OFDM) subcarriers;
a plurality of base station controllers, each coupled to control and communicate with at least two base stations within the plurality of base stations; and
a mechanism to control the plurality of base stations and the plurality of base station controllers to:
allocate available frequency channels at different channel frequencies for a base station into a nonreusable frequency pool for channel frequencies designated for use by the base station only, a reusable frequency pool for channel frequencies that can be used by the base station and neighboring base stations, and an unallocated frequency pool for channel frequencies that are not allocated to the nonreusable and the reusable frequency pool;
allocate a channel frequency from either the reusable frequency pool or the unallocated frequency pool to a wireless subscriber station in communication with the base station when the wireless subscriber station is in a non-hand-off zone to communicate with the base station only; and allocate a channel frequency from the nonreusable frequency pool for the base station to a wireless subscriber station in communication with the base station when the wireless subscriber station is in a hand-off zone to communicate with the base station and at least one neighboring base station.

17. A wireless communication system, comprising:
a plurality of base stations spatially distributed to wirelessly communicate with subscriber stations via radio links that comprise orthogonal frequency division multiplexing (OFDM) subcarriers;
a plurality of base station controllers, each coupled to control and communicate with at least two base stations within the plurality of base stations; and
a mechanism to control the plurality of base stations and the plurality of base station controllers to:
allocate available frequency channels at different channel frequencies in the wireless communication system into an allocated frequency pool for channel frequencies allocated to base stations, and a unallocated frequency pool for channel frequencies that can be used by any base station in communication with any subscribed station at any location relative to the any base station;
allocate a reusable channel frequency allocated to a base station from the allocated frequency pool to a wireless subscriber station in communication with a second base station adjacent to the base station when the wireless subscriber station is in a non-hand-off zone to communicate with the second base station; and
allocate a nonreusable channel frequency from the allocated frequency pool for the base station assigned with the nonreusable channel frequency to a wireless subscriber station in communication with the base station when the wireless subscriber station is in a hand-off zone to communicate with the base station and at least one neighboring base station.

18. An article comprising one or more machine-readable storage media that store machine-executable instructions operable to cause a machine to:
allocate available frequency channels at different channel frequencies for a base station and its neighboring base stations into a nonreusable frequency pool for channel frequencies designated for use by the base station only, and a reusable frequency pool for channel frequencies that can be used by the base station and its neighboring base stations;
allocate a channel frequency from the reusable frequency pool to a wireless subscriber station in communication with the base station when the wireless subscriber station is in a non-hand-off zone to communicate with the base station only; and
allocate a channel frequency from the nonreusable frequency pool for the base station to a wireless subscriber station in communication with the base station when the wireless subscriber station is in a hand-off zone to communicate with the base station and at least one neighboring base station.

* * * * *